(12) United States Patent
Ranellucci

(10) Patent No.: US 11,658,815 B2
(45) Date of Patent: *May 23, 2023

(54) SYSTEM AND METHOD FOR PERFORMING KEY OPERATIONS DURING A MULTI-PARTY COMPUTATION PROCESS

(71) Applicant: Coinbase IL RD Ltd., Oakland, CA (US)

(72) Inventor: Samuel Ranellucci, Petach Tikva (IL)

(73) Assignee: Coinbase IL RD Ltd., Oakland, CA (US)

(*) Notice: Subject to any disclaimer, the term of this patent is extended or adjusted under 35 U.S.C. 154(b) by 160 days.

This patent is subject to a terminal disclaimer.

(21) Appl. No.: 16/945,948

(22) Filed: Aug. 3, 2020

(65) Prior Publication Data

US 2022/0038271 A1    Feb. 3, 2022

(51) Int. Cl.
*H04L 9/08* (2006.01)
*G06F 9/30* (2018.01)

(52) U.S. Cl.
CPC .......... *H04L 9/0861* (2013.01); *G06F 9/3001* (2013.01); *G06F 9/30029* (2013.01); *H04L 9/0819* (2013.01); *H04L 9/0841* (2013.01); *H04L 9/0894* (2013.01)

(58) Field of Classification Search
CPC ....... H04L 9/08; H04L 9/0861; H04L 9/0819; H04L 9/0841; H04L 9/08944; H04L 9/06; H04L 9/0637; H04L 9/085; H04L 63/06; H04L 63/062; G06F 9/30; G06F 9/3001; G06F 9/30029
See application file for complete search history.

(56) References Cited

U.S. PATENT DOCUMENTS

| | | | |
|---|---|---|---|
| 10,630,471 B1* | 4/2020 | Lindell | H04L 9/0861 |
| 2015/0341326 A1* | 11/2015 | Premnath | H04L 9/3218 |
| | | | 713/171 |
| 2020/0153640 A1* | 5/2020 | Ranellucci | H04L 9/088 |
| 2020/0259800 A1* | 8/2020 | Masny | H04L 9/0861 |
| 2021/0167946 A1* | 6/2021 | Bitan | H04L 9/0894 |
| 2021/0273784 A1* | 9/2021 | Gryb | H04L 9/0861 |
| 2021/0391987 A1* | 12/2021 | Badrinarayanan | H04L 9/008 |

* cited by examiner

*Primary Examiner* — Shaqueal D Wade-Wright
*Assistant Examiner* — Shaqueal D Wade
(74) *Attorney, Agent, or Firm* — Perkins Coie LLP

(57) ABSTRACT

In certain embodiments, shares related to an output of a function having multiple shares of a secret as input may be computed. In some embodiments, with respect to initial key shares of a key that are collectively held by multiple parties, an output of an arithmetic function (performed on an initial key share of the initial key shares) may be received from each of the multiple parties. The outputs from the multiple parties may be provided as input for a Multi-Party Computation (MPC) process, where the MPC process outputs final key shares in connection with the outputs from the multiple parties being provided as input for the MPC process. With respect to each party of the multiple parties, a final key share of the final key shares may be sent to the party.

20 Claims, 3 Drawing Sheets

SYSTEM AND METHOD FOR PERFORMING KEY OPERATIONS DURING A MULTI-PARTY COMPUTATION PROCESS

FIELD

The invention generally relates to system and method for performing key operations during a multi-party computation process.

BACKGROUND

Key exchange (also key establishment) is a method in cryptography by which cryptographic keys are exchanged between two parties, allowing use of a cryptographic algorithm.

If the sender and receiver wish to exchange encrypted messages, each must be equipped to encrypt messages to be sent and decrypt messages received. The nature of the equipping they require depends on the encryption technique they might use. If they use a code, both will require a copy of the same codebook. If they use a cipher, they will need appropriate keys. If the cipher is a symmetric key cipher, both will need a copy of the same key. If it is an asymmetric key cipher with the public/private key property, both will need the other's public key.

Diffie-Hellman key exchange is a method of securely exchanging cryptographic keys over a public channel and was one of the first public-key protocols. Diffie-Hellman is one of the earliest practical examples of public key exchange implemented within the field of cryptography.

The process begins by having the two parties, Alice and Bob, agree on an arbitrary starting value that does not need to be kept secret but should be different every time. Each of the parties also selects a secret value that they keep to themselves—in this case, first secret and a second secret. The crucial part of the process is that both parties mix their own secret value together with their mutually shared value, resulting in two mixed values, and then publicly exchange the two mixed values. Finally, each party mixes its private value and the two mixed values they received from the other party. The result is a final value that is identical to the in both parties.

If a third party listens to the exchange, it would only know the common value and one of the mixed values, but then it would be computationally difficult for the third party to determine the final value. In fact, when using large numbers as secret values, this action is computationally expensive. It is impossible to do in a reasonable amount of time even for modern supercomputers. When exchanging keys during evaluation of a garbled circuit, the load on the third party renders the process inefficient in time.

SUMMARY

In one aspect of the invention a method is provided of computing shares of an output of a function having multiple shares of a secret as input, the method including each party of the multiple parties obtaining an initial share of the secret, such that all initial shares together operate as the secret, none of the parties reveal the initial shares of the secret throughout the entire method; each party of the multiple parties performing an arithmetic operator on the initial shares of the secret; each party of the multiple parties sending an output of the arithmetic operator on the initial share to a Multi-Party Computation (MPC) process; performing the MPC process using an arithmetic circuit, said MPC process receives the output of the arithmetic function and outputs final shares by performing a mathematical operation; the MPC process outputting one final share of the final shares to each party of the multiple parties.

In some cases, each party of the multiple parties applies the same arithmetic operator on the initial share of the secret.

In some cases, the method further includes receiving a request to exchange cryptographic keys between the multiple parties, wherein the initial shares are cryptographic keys stored in the multiple parties.

In some cases, the exchange of cryptographic keys is performed using a Diffie-Hellman process.

In some cases, the method further includes performing an initial MPC process receiving as input the initial share of the secret from each party of the multiple parties sending, the initial MPC process outputting a plurality of fresh shares and sending one fresh share of the plurality of fresh shares to each party of the multiple parties, and each party of the multiple parties performing the arithmetic function on one fresh share received from the initial MPC process. In some cases, the plurality of fresh shares are additive shares of multiplication of the initial shares of the secret.

In some cases, the arithmetic circuit is a Boolean circuit. In some cases, the arithmetic circuit is a garbled circuit. In some cases, the mathematical operation is an exponentiation having a random generator of an elliptical curve as base and accumulation of the outputs of the arithmetic function as exponent.

BRIEF DESCRIPTION OF THE DRAWINGS

The invention may be more clearly understood upon reading of the following detailed description of non-limiting exemplary embodiments thereof, with reference to the following drawings, in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

Illustrative embodiments of the invention are described below. In the interest of clarity, not all features/components of an actual implementation are necessarily described.

The invention, in embodiments thereof, provides a system and method for exchanging keys as part of a Multi-Party Computation (MPC) process. The MPC process is performed between multiple parties. The multiple parties begin the process when holding shares of a secret, such as a cryptographic key, receive a request to perform a key operation that requires exchanging the shares without revealing the entire secret during the entire process. The parties exchange information, while the heavy computation is performed by the parties, thereby outputting a shared value known to all parties.

Figure 1:
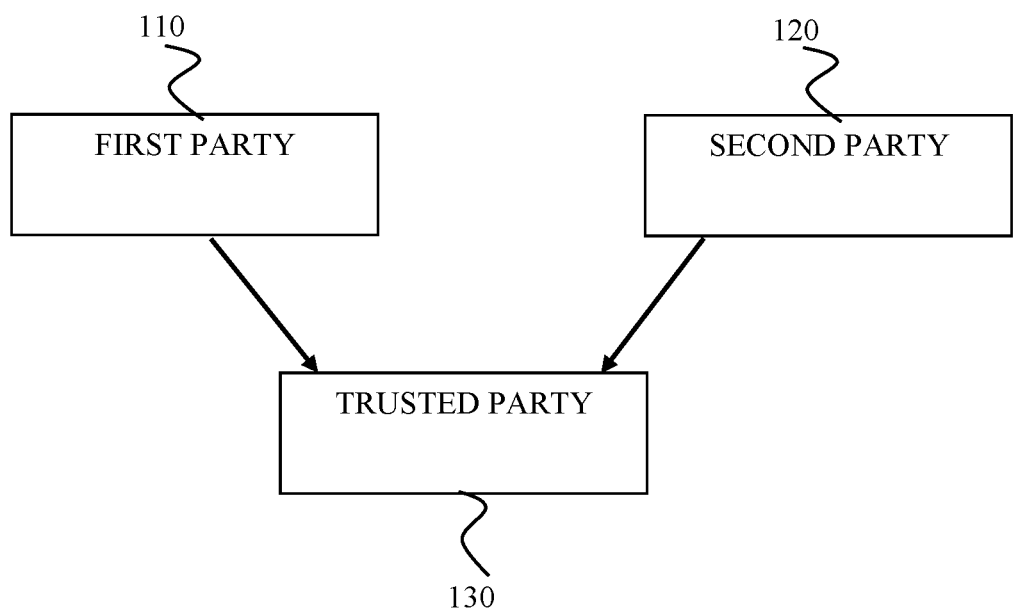
FIG. 1 shows a computerized environment for performing a key operation as part of a Multi-Party Computation (MPC) process between two parties and a server, according to exemplary embodiments of the invention.

The invention, in embodiments thereof, provides a method computes shares of a function applied on x and y using garbled circuits without revealing x; y and without using either the function F, the group G and the operation H inside the garbled circuit. This method may be used against a semi-honest adversary, an adversary that follows the description of the protocol but tries to learn information from the transcript of the protocol. This is a limited adversary. The processes performed in the method are relatively inexpensive within a garbled circuit—Addition and multiplication FIG. 1 shows a computerized environment for performing a key operation as part of a Multi-Party Computation (MPC) process between two parties and a server, according to exemplary embodiments of the invention. The computerized environment includes a first party 110, a second party 120 and a secure MPC process represented herein as party 130. The party 130 may be a server. The MPC process may be performed by the multiple parties 110 and 120 without the party 130. The first party 110, a second party 120 may be computerized modules or may be embedded in an electronic device such as a mobile phone, personal computer, laptop, tablet and the like. The process elaborated below may be implemented on a computerized environment having two or more parties, in addition to the party 130. Each of the first party 110, a second party 120 and a party 130 include a communication module configured to exchange messages and/or signals between each other. The messages may be of a predefined format. The communication modules of the parties 110, 120 and 130 may enable communication over the internet, such as using an internet gateway, local access network, wide access network and the like. The communication modules may also operate over a non-internet communication channel, for example using wired communication, fiber optics, USB, or wireless communication such as Bluetooth and the like.

Each of the parties 110, 120 and 130 may also have a memory unit, or access to a memory unit located in a remote device working uniquely with a specific party of the parties 110, 120 and 130. The memory unit may be either volatile memory or non-volatile memory. The memory unit may store instructions for performing the process elaborated below. The memory unit may also store the shares of the secret known to each of the parties 110, 120 and 130.

Each of the parties 110, 120 and 130 may also have a processing module configured to manage the part of the process performed in each party. The processing module may be a processor, a CPU, a microprocessor, either implemented in software, hardware or firmware.

Figure 2:
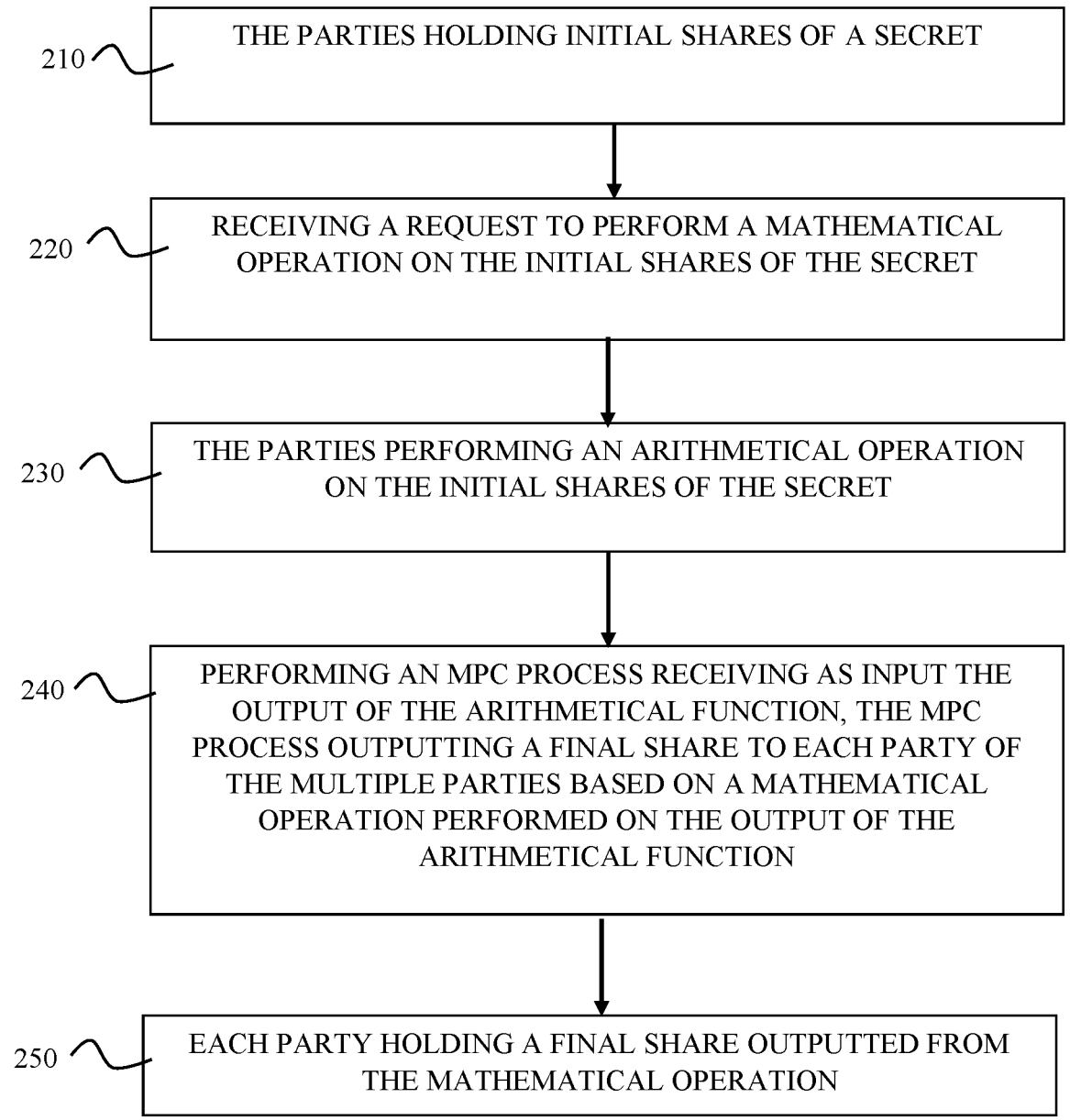
FIG. 2 shows a method for performing a key operation as part of a Multi-Party Computation (MPC) process between two parties and a server, according to exemplary embodiments of the invention; and, FIG. 3 shows a method of exchanging information between the multiple parties such that none of the parties can extract the key of the other party, according to exemplary embodiments of the invention.

FIG. 2 shows a method for performing a Multi-Party Computation (MPC) process on an arithmetic circuit between multiple parties, according to exemplary embodiments of the invention. The MPC process may be used to perform key exchange process between the multiple parties or another process utilizing the shares of a secret stored in the multiple parties. Exchanging the keys may include performing a Diffie-Hellman key exchange. The essence of the MPC process is to prevent a single unit from obtaining the entire secret, hence each of the parties which take part in the process of exchanging the secret hold a share of the secret. The party does not hold a share of the secret.

Step 210 shows the multiple parties holding shares of a secret. The secret may be a cryptographic key. In some cases, each share functions as a cryptographic key. The properties of each of the shares stored in each of the parties may be identical. That is, if one party holds a cryptographic key and uses the cryptographic key in the key exchange, other parties use the shares they hold that have the same properties, such as size, format and the like.

Step 220 shows receiving a request to perform a mathematical operation on the initial shares of the secret. The mathematical function may be public key operation as part of the key exchange, or any other mathematical function desired by a person skilled in the art to be performed using an arithmetic circuit, such as a Boolean circuit or garbled circuit. The request may be received from a third party communicating with one of the multiple parties, or from an application operating on one of the multiple parties. The request may be required as part of a process running on another computerized device.

Step 230 shows the parties performing an arithmetic operator on the initial shares of the secret. The arithmetic operator may be, for example, addition, subtraction, multiplication, modular elliptic curve, binary field operation, inversion, mod prime or RSA modulus and additional arithmetic operators desired by a person skilled in the art. The arithmetic operator may be performed locally at the parties, or using a server communicating with the parties, not using an MPC process.

Step 240 shows performing an MPC process receiving as input the output of the arithmetic operator from the multiple shares. The MPC process outputting a final share to each party of the multiple parties. the final shares are outputted based on a mathematical operation performed on the output of the arithmetic operator performed by the multiple parties.

The MPC process is implemented by exchanging information between the multiple parties such that none of the parties can extract the key of the other party. The information may be exchanged using a messaging application. The information may be exchanged by sending a message to a communication module to update a value in a predefined memory address in the memory module of the parties. The information is exchanged based on a predefined set of rules stored in the memory of the multiple parties. The process of exchanging information is elaborated in FIG. 3. The information may be results of mathematical processes and outputs of cryptographic functions and/or operators. The cryptographic functions and/or operators are performed by the multiple parties, while the MPC process performs the mathematical processes, mainly addition and multiplications, to improve efficiency of the process, as the MPC process is required to perform additional processes in addition to the exchange of cryptographic keys, such as generating a garbled circuit.

Step 250 shows each party holding a final share outputted from a mathematical operation performed on the output of the arithmetic function applied on the initial shares held by the parties in step 210. The mathematical operation may be key exchange. The mathematical operation is executed on an arithmetic circuit, such as a Boolean circuit, garbled circuit and the like. The final shares (FS) may be additive shares of the result of the mathematical operation. For example, given there are three parties, holding initial shares $S_1$, $S_2$ and $S_3$, the output of the process is final shares $FS_1$, $FS_2$, $FS_3$, such that $FS_1+FS_2+FS_3$ equals $S_1+S_2+S_3$.

Figure 3:
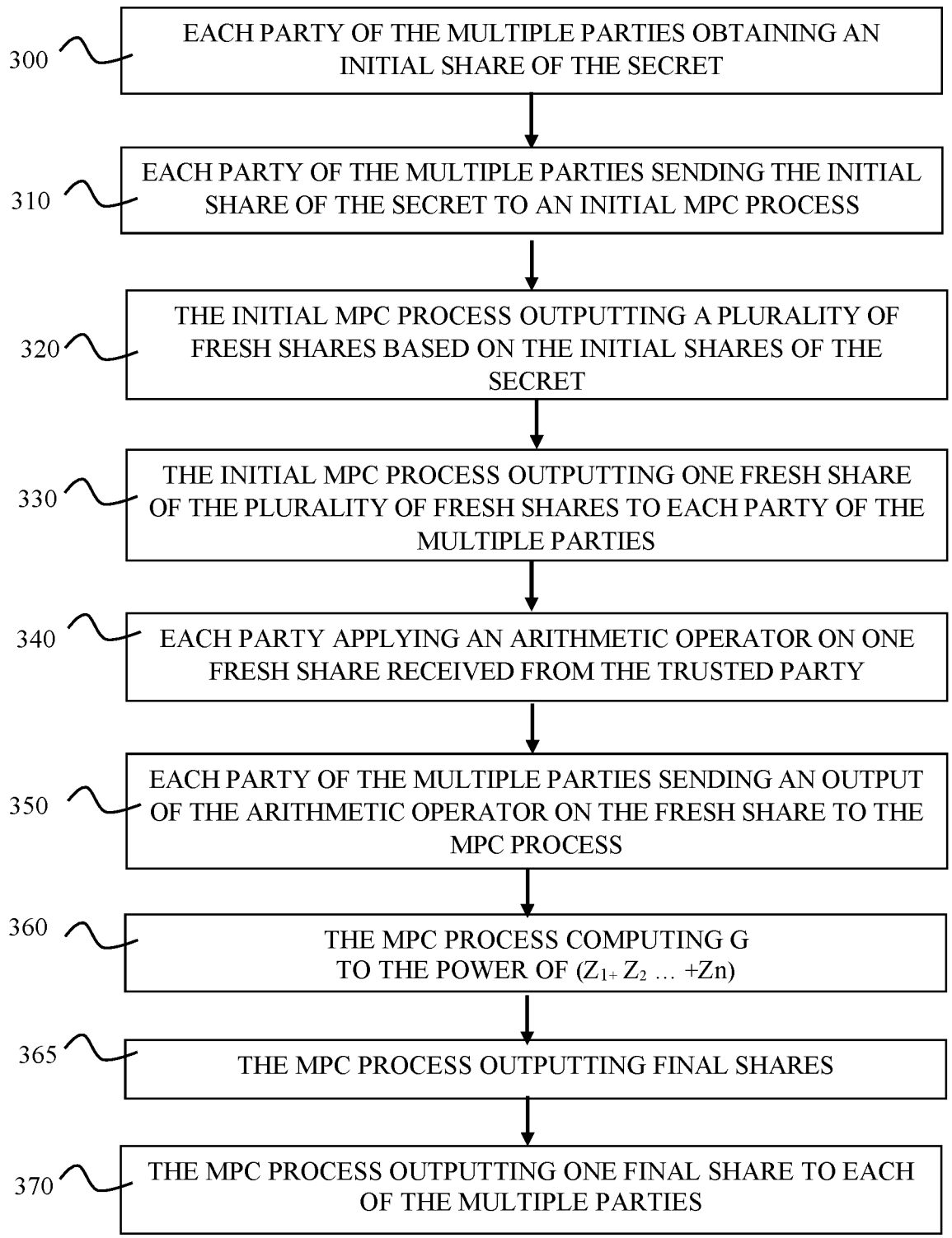

FIG. 3 shows a method of exchanging information between the multiple parties such that none of the parties can extract the key of the other party, according to exemplary embodiments of the invention.

Step 300 shows each party of the multiple parties obtaining an initial share of the secret. All the initial shares, when used together, can be used as the secret. It is a functional requirement of the method that no party of the multiple parties has access to all the initial shares of the secret throughout the entire method.

Step 310 shows each party of the multiple parties sending the initial share of the secret to an initial MPC process. Sending the initial shares may be performed by sending a message over the internet, via a wired cable or via a cellular modem.

Step 320 shows the initial MPC process generates a plurality of fresh shares based on the initial shares of the secret. In some cases, the fresh shares are additive shares of multiplication of the initial shares (IS) of the secret. For example, denote the fresh shares generated by the MPC process party as values $Z_1$ to $Zn$, the accumulation of the fresh shares $Z_1$ to $Zn$ equals $IS_1*IS_2 \ldots *Isn$, $IS_1$ is the initial share provided from party #1, $IS_2$ is the initial share provided from party #2 etc.

Step 330 shows the initial MPC process outputting one fresh share of the plurality of fresh shares to each party of the multiple parties. For example, party #1 receives fresh share $Z_1$, party #2 receives fresh share $Z_2$ and the like. Sending the fresh shares may be performed by sending a message over the internet, via a wired cable or via a cellular modem. The fresh share may be stored in a predefined memory address in the memory of each of the multiple parties.

Step 340 shows each party of the multiple parties applying an arithmetic operator on the fresh share received from the initial MPC process. The arithmetic operator may be a hash function. The arithmetic operator may be computing a group G known to all the multiple parties in the order of the fresh share, also denoted as $G^{\wedge}Zi$.

Step 350 shows each party of the multiple parties sending an output of the arithmetic operator on the fresh share to the MPC process. Sending the output of the arithmetic operator process may be performed by sending a message over the internet, via a wired cable or via a cellular modem.

Step 360 shows the MPC process computing Gin the order of $(Z_{1+} Z_2 \ldots Zn)$. Computing the value of the group G to the power of $(Z_{1+}Z_2 \ldots +Zn)$ may be performed by multiplying the outputs of the arithmetic operator as received from the multiple parties. For example, party #1 sends G to the power of $Z_1$, party #2 sends G to the power of $Z_2$ and party #n sends G to the power of $Z_n$. The MPC process multiplies the values received from all the multiple parties $(G^{\wedge}Z_1*G^{\wedge}Z_2* \ldots G^{\wedge}Zn)$. The group G may be extracted from an elliptical curve used by the arithmetic circuit performing the MPC process.

Step 365 shows the MPC process outputting final shares (FS). The accumulated sum of all the final shares generated by the MPC process equals to the multiplication of the group G to the power of the accumulation of all the values $Z_1$, $Z_2 \ldots Zn$.

Step 370 shows the MPC process sending the final shares $FS_1$ to FSn to the parties. Each party of the multiple parties receives another final share, such that all the final shares can later be used during an MPC process performed by the parties.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention disclosed herein not be limited to the particular embodiment disclosed as the best mode contemplated for carrying out this invention.

What is claimed is:

1. A method of computing shares of an output of a function having multiple shares of a secret as input, the method comprising:
   with respect to initial key shares of a key that are collectively held by multiple parties and together operate as the key, receiving, from each party of the multiple parties, an output of an arithmetic function performed on an initial key share of the initial key shares, the initial key share held by the party being different from one or more other initial key shares of the initial key shares held by one or more other parties of the multiple parties;
   providing the outputs from the multiple parties as input for a Multi-Party Computation (MPC) process, the MPC process outputting final key shares in connection with the outputs from the multiple parties being provided as input for the MPC process; and
   with respect to each party of the multiple parties, sending a final key share of the final key shares to the party, the final key share being different from one or more other final key shares of the final key shares sent to one or more other parties of the multiple parties.

2. The method of claim 1, further comprising receiving a request to exchange cryptographic keys between the multiple parties, wherein the initial key shares are cryptographic keys stored in the multiple parties.

3. The method of claim 2, wherein the exchange of cryptographic keys is performed using a Diffie-Hellman process.

4. The method of claim 1, further comprising:
   receiving, from each party of multiple parties, the initial key share held by the party;
   providing the initial key shares from the multiple parties as input for an initial Multi-Party Computation (MPC) process, the initial MPC process outputting fresh key shares in connection with the initial key shares being provided as input for the initial MPC process; and
   with respect to each party of the multiple parties:
      sending a fresh key share of the fresh key shares to the party, the fresh key share sent to the party being different from one or more other fresh key shares of the fresh key shares sent to one or more other parties of the multiple parties; and
      in response to sending the fresh key share to the party, receiving, from the party, an output of at least one arithmetic function performed on the fresh key share sent to the party.

5. The method of claim 4, wherein the fresh key shares are additive shares of multiplication of the initial key shares of the key.

6. The method of claim 1, wherein the MPC process uses a Boolean circuit to output the final key shares.

7. The method of claim 1, wherein the MPC process uses a garbled circuit to output the final key shares.

8. The method of claim 7, wherein the MPC process uses an exponentiation to output the final key shares, the exponentiation having a random generator of an elliptical curve as base and accumulation of the outputs of the arithmetic function as exponent.

9. A method comprising:
receiving, from each party of multiple parties, an initial key share of a key, such that all the received initial key shares together operate as the key;
providing the initial key shares from the multiple parties as input for a first Multi-Party Computation (MPC) process, the first MPC process outputting fresh key shares in connection with the initial key shares being provided as input for the first MPC process;
with respect to each party of the multiple parties:
sending a fresh key share of the fresh key shares to the party, the fresh key share sent to the party being different from one or more other fresh key shares of the fresh key shares sent to one or more other parties of the multiple parties;
in response to sending the fresh key share to the party, receiving, from the party, an output of an arithmetic function performed on the fresh key share sent to the party;
providing the outputs from the multiple parties as input for a second MPC process, the second MPC process outputting final key shares in connection with the outputs from the multiple parties being provided as input for the second MPC process; and
with respect to each party of the multiple parties, sending a final key share of the final key shares to the party, the final key share being different from one or more other final key shares of the final key shares sent to one or more other parties of the multiple parties.

10. The method of claim 9, wherein the initial key shares are received via a Diffie-Hellman cryptographic key exchange process.

11. The method of claim 9, wherein the fresh key shares are additive shares of multiplication of the initial key shares of the key.

12. The method of claim 9, wherein the second MPC process uses a Boolean circuit to output the final key shares.

13. The method of claim 9, wherein the second MPC process uses a garbled circuit to output the final key shares.

14. The method of claim 9, wherein the second MPC process uses an exponentiation to output the final key shares, the exponentiation having a random generator of an elliptical curve as base and accumulation of the outputs of the arithmetic function as exponent.

15. A method comprising:
with respect to initial key shares of a key that are collectively held by multiple parties, receiving, from each party of the multiple parties, an output of an arithmetic function performed on an initial key share of the initial key shares, the initial key share held by the party being different from one or more other initial key shares of the initial key shares held by one or more other parties of the multiple parties;
providing the outputs from the multiple parties as input for a Multi-Party Computation (MPC) process, the MPC process using a garbled circuit and outputting final key shares by performing a mathematical operation, wherein the mathematical operation is an exponentiation having a random generator of an elliptical curve as base and accumulation of the outputs of the arithmetic function as exponent; and
with respect to each party of the multiple parties, sending a final key share of the final key shares to the party, the final key share being different from one or more other final key shares of the final key shares sent to one or more other parties of the multiple parties.

16. The method of claim 15, further comprising:
receiving, from each party of multiple parties, the initial key share held by the party;
providing the initial key shares from the multiple parties as input for an initial Multi-Party Computation (MPC) process, the initial MPC process outputting fresh key shares in connection with the initial key shares being provided as input for the initial MPC process; and
with respect to each party of the multiple parties:
sending a fresh key share of the fresh key shares to the party, the fresh key share sent to the party being different from one or more other fresh key shares of the fresh key shares sent to one or more other parties of the multiple parties; and
in response to sending the fresh key share to the party, receiving, from the party, an output of at least one arithmetic function performed on the fresh key share sent to the party.

17. The method of claim 16, wherein the initial key shares are received via a Diffie-Hellman cryptographic key exchange process.

18. The method of claim 16, wherein the fresh key shares are additive shares of multiplication of the initial key shares of the key.

19. The method of claim 16, wherein the initial MPC process uses a Boolean circuit to output the fresh key shares.

20. The method of claim 16, wherein the initial MPC process uses a garbled circuit to output the fresh key shares.

* * * * *